June 9, 1964 BO N. HOFFSTROM 3,136,021

TAPE CONNECTORS

Filed May 19, 1961 2 Sheets-Sheet 1

INVENTOR
Bo N. Hoffstrom

BY Stauch, Nolan & Neale
ATTORNEYS

INVENTOR
Bo N. Hoffstrom
BY Strauch, Nolan & Neale
ATTORNEYS

United States Patent Office 3,136,021

Patented June 9, 1964

3,136,021
TAPE CONNECTORS

Bo N. Hoffstrom, Santa Monica, Calif., assignor to Douglas Aircraft Company, Inc., Santa Monica, Calif.

Filed May 19, 1961, Ser. No. 111,379
5 Claims. (Cl. 24—265)

This invention relates to connectors and more particularly to connectors for flat strands such as tapes or webs.

Flat tapes or webs are in many cases preferred to round cables for load transmission. For example, tapes offer a distinct advantage when used as cargo slings since they provide a flat load engaging surface which substantially reduces the possibility of damage to the load and eliminates the cutting action often associated with ropes, wires or cables. Also, tapes can safely be coiled on a drum under much higher loads than ropes, wires or cables.

However the use of tapes or webs has been limited to some extent because of the lack of suitable means for attaching the end of the tape to the load or another force applying or force transmitting device. Experience has shown that connectors developed for round strands are not suitable for use with flat tapes since they produce stress concentration which causes the tape to break at loads well below those which the main body of the tape can accommodate safely.

With these considerations in mind, it is the principal purpose and object of the present invention to provide improved collet type connectors for flat strands which avoid the development of stress concentration and thus develop an unusually high percentage of the inherent strength of the strands.

It is a further object of the present invention to provide improved collet type tape connectors which are adapted to accommodate strands of varying thickness.

It is also an object of the present invention to provide improved collet type tape connectors which are unusually compact and light weight.

It is an additional object of the present invention to provide improved collet type tape connectors which facilitate easy installation and removal of the tape.

Additional objects will become apparent as the description proceeds in connection with the accompanying drawings in which.

While the tape connector of the present invention may be utilized effectively in any case where it is desired to connect a tape to a load, to an anchor, or to another load transmitting device such as another tape or cable, the advantages of the invention are most fully realized when the connector is used with tapes or strands of substantial size adapted to carry heavy loads, i.e. in the neighborhood of 50,000 lbs. An example of such use is in connection with an aircraft arresting system in which one end of the tape is wound on a drum and the opposite end of the tape is connected to a pendant which engages a hook on the aircraft.

Figure 1:
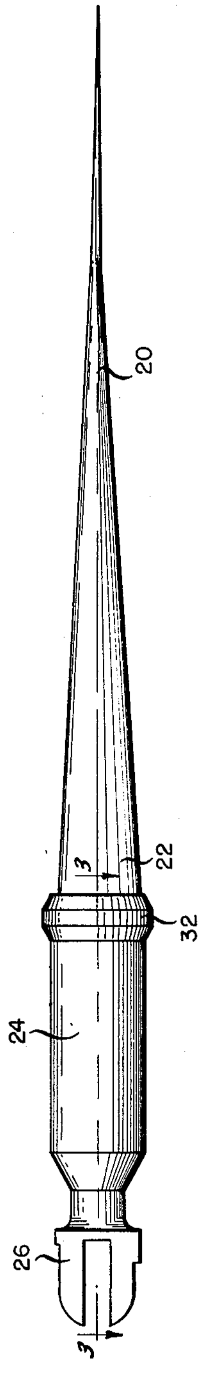
FIGURES 1 and 2 are side views of the improved connector of the present invention.
Figure 2:
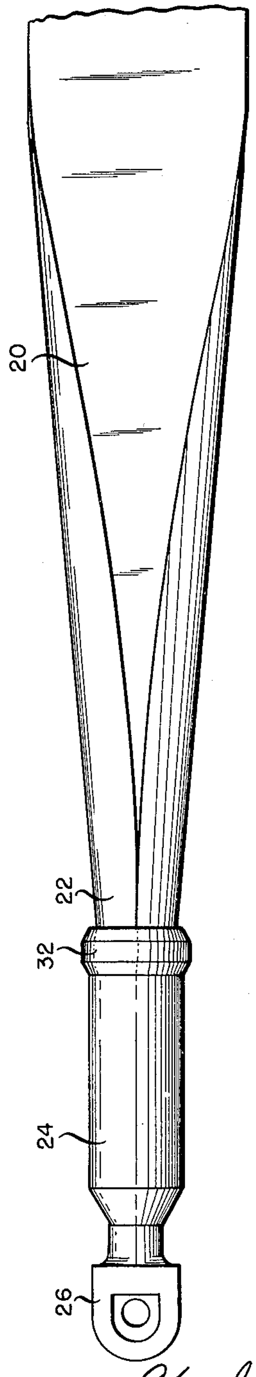
Figure 3:
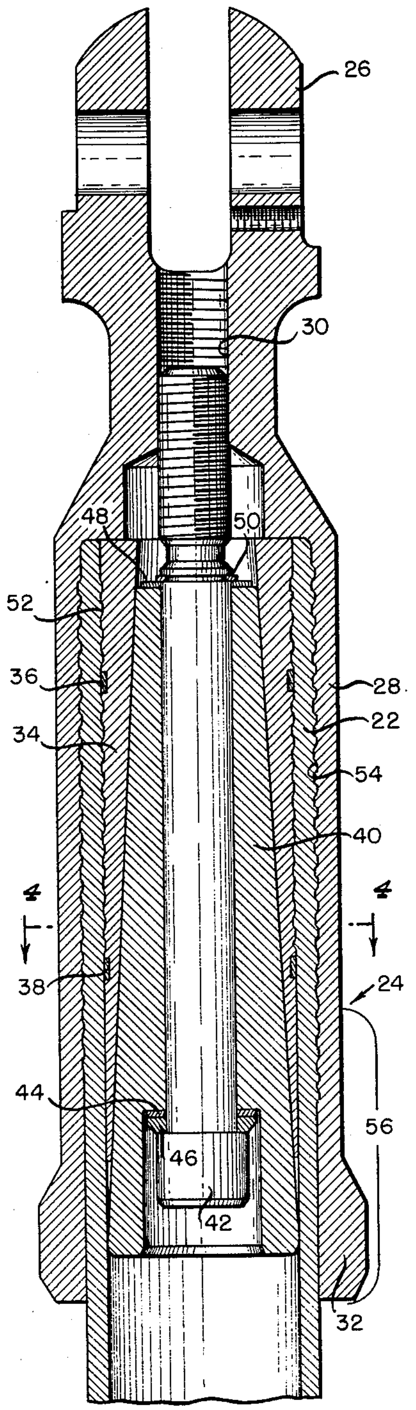
FIGURE 3 is a central section of the connector taken along line 3—3 of FIGURE 1.
Figure 4:
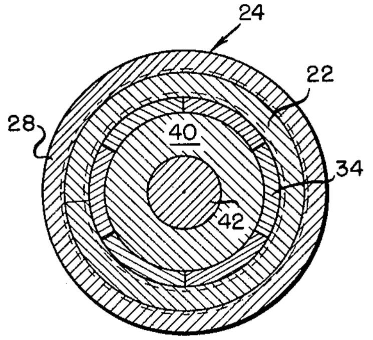
FIGURE 4 is a transverse section of the connector taken along line 4—4 of FIGURE 3.

In such use the main body of the tape 20 is flat and is adapted to be coiled around a drum. As shown in FIGURES 1 and 2, the free end of the tape is folded or wrapped to form a cylindrical envelope 22 which fits within the body of the tape connector indicated generally at 24. Formed integrally with the main body of the tape connector 24 is a clevis 26 which matches an adapter attached to the connecting element (not shown) such as an aircraft engaging pendant. The main body member of the connector 24 has a hollow cylindrical portion 28, the inner end of which leads into a reduced diameter threaded bore 30 and the outer end of which is enlarged as at 32 to increase the resistance of the unit to impact damage. The cylindrical end portion 22 of the tape is clamped against the inner wall of the body portion 28 by a hollow collet assembly 34 which is split axially into six segments held together by two circumferential spring members 36 and 38. The inner surface of the collet assembly is tapered to receive a correspondingly tapered outer surface of a hollow spreader bar 40. A retaining screw 42 extends through a central bore in the spreader 40 and is threaded into the bore 30. In order to permit free rotation of the screw 42, a washer 44 and a ring 46 are provided under its head. Washer 48 and snap ring 50 prevent relative axial motion of the screw 42 with respect to the spreader 40.

In use the end of the tape is wrapped around the collet assembly 34 and the wrapped tape and the collet assembly are inserted in the bore of the housing 28 with the spreader 40 and the screw 42 removed. The spreader 40 is then installed and the screw 42 is tightened with a wrench long enough to extend beyond the point where the tape is opened to its flat configuration. It is a feature of the design that the screw 42 need be tightened only to the extent necessary to prevent undue looseness of the parts. It is not necessary to tighten it to establish any particular degree of wedging engagement of the parts.

As the load is applied to the tape, the collet assembly 34 is pulled toward the open end of the main connector body 28 since the coefficient of friction between the tape and the collet assembly is considerably higher than the coefficient of friction between the collet assembly and the spreader 40. For this purpose, the surface between the exterior of the spreader and the interior of the collet may be treated with a suitable lubricant, for example molybdenum disulfide. The coefficient of friction between the tape and the outer surface of the collet assembly is increased by providing grooves 52 on the outer surface of the latter. To prevent the establishment of notch effects on the tape, the grooves are omitted from the portion of the collet assembly nearest the open end of the main connector member 28, the diameter of the collet assembly being reduced in this area, for example by .020 of an inch. For similar purposes grooves 54 are provided on the inner diameter of the main connector member 28. Again, to prevent the establishment of notch effects, a portion, for example the region shown by the reference numeral 56 of the inner diameter of the connector member 28, is provided with a divergent taper.

With the continued application of load, the collet assembly tends to be pulled out of the connector over the spreader 40 and thus expands increasing the radial pressure between the tape and the inner wall of the main connector body 28. The wall of the spreader is made sufficiently thick to resist the radial pressure set up by the tightening resulting from the tape load application. If the connector member 28 and the spreader 40 have the same yield strength, the wall thickness of the latter at its inner end should be at least as great as the wall thickness of the former.

With the construction of the present invention, the axial load on the screw 42 is held to a fraction, for example $\frac{1}{10}$ of the tape pull-out force, at the instant when complete self-locking occurs. The function of the screw 42 thus is that of a servo-actuator. This is an essential feature of the present invention since, if the screw 42 were required to take a substantially higher part of the total tape load, the available space would not permit its dimensions to match the required load.

The circular configuration of the entire connector assembly results in greatly improved utilization of materials since the stress components are all either pure tensile as in the main connector body or pure compression as in the collet assembly and the spreader. This permits the connector to be unusually compact.

The tape may be released by unscrewing the screw 42. The snap ring 50 and the washer 48 will then push the spreader 42 out of engagement with the collet assembly thus releasing the radial pressure on the tape. The tape and the collet assembly can then be readily pulled out of the main connector body.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A connector for a flat tape comprising a housing unit having an essentially cylindrical bore open at one end to the exterior of said housing and having a shoulder at its opposite end, an expansible collet assembly positioned in said bore for axial movement therein and having an essentially cylindrical outer surface forming with said bore a circumferential space for receiving said tape, said collet assembly having a frusto-conical inner surface, the small end of which is adjacent said shoulder in said bore, a spreader unit received within said collet assembly, said spreader unit having a frusto-conical outer surface, the smaller end of which is disposed adjacent said shoulder in said bore, a retainer screw for holding said spreader unit in fixed axial position within said housing unit, said retainer screw being threaded into one of said units, means fixing said screw against movement axially of the other unit, said frusto-conical surfaces on said spreader unit and said collet assembly being adapted when a load is applied to said tape to expand said collet assembly and frictionally hold said tape in said housing.

2. A connector for a flat tape comprising a housing having a cylindrical bore, a hollow expansible collet assembly in said bore, said collet assembly having an essentially cylindrical outer surface and forming with said bore a circumferential space for receiving said tape, a hollow spreader unit received within said collet assembly, a screw extending through said spreader unit and fixed against axial movement with respect thereto, the screw being threaded into said housing to retain said spreader in fixed axial relation with said housing, said spreader unit and said collet assembly having mating, wedging surfaces adapted when a load is applied to said tape to expand said collet assembly and frictionally hold said tape within said housing.

3. A connector for a flat tape comprising a housing having an essentially cylindrical bore closed at one end and open at the other end to the exterior of said housing, a hollow expansible collet assembly positioned in said bore for axial movement therein, said collet assembly having an essentially cylindrical outer surface forming with said bore a circumferential space for receiving said tape, a hollow spreader unit received within said collet assembly, a screw extending axially through said spreader unit and threaded into said closed end of said bore to adjustably position said spreader unit within said housing and fix said spreader unit against axial movement with respect to said housing, said spreader unit and said collet assembly having mating frusto-conical surfaces, the smaller ends of which are disposed adjacent the closed end of said bore and adapted, when a load is applied to said tape, to expand said collet assembly and frictionally hold said tape within said housing.

4. The connector according to claim 3 in which said essentially cylindrical surface of said bore and said essentially cylindrical surface of said collet assembly are provided with circumferential grooves except in the region adjacent said open end of said bore.

5. The collet assembly according to claim 3 wherein said other end of said bore has a slightly divergent taper and the adjacent portion of said collet assembly has a slightly convergent taper.

References Cited in the file of this patent

UNITED STATES PATENTS

| | | |
|---|---|---|
| 1,403,553 | Horn | Jan. 17, 1922 |
| 1,753,005 | Grady | Apr. 1, 1930 |
| 2,049,953 | Forster | Aug. 4, 1936 |
| 2,071,478 | Wick | Feb. 23, 1937 |
| 2,146,756 | Miller | Feb. 14, 1939 |
| 2,766,804 | Kaiser | Oct. 16, 1956 |